US009541403B2

United States Patent
Ohmori et al.

(10) Patent No.: US 9,541,403 B2
(45) Date of Patent: Jan. 10, 2017

(54) METHOD AND DEVICE FOR DISPLAYING ROUTE

(71) Applicant: Furuno Electric Co., Ltd., Nishinomiya (JP)

(72) Inventors: Takashi Ohmori, Nishinomiya (JP); Masato Okuda, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 14/251,353

(22) Filed: Apr. 11, 2014

(65) Prior Publication Data
US 2014/0309931 A1 Oct. 16, 2014

(30) Foreign Application Priority Data

Apr. 12, 2013 (JP) ................................. 2013-083986

(51) Int. Cl.
G01C 21/20 (2006.01)
G01C 23/00 (2006.01)

(52) U.S. Cl.
CPC ............. *G01C 21/203* (2013.01); *G01C 21/20* (2013.01); *G01C 23/00* (2013.01)

(58) Field of Classification Search
CPC ..... G01C 21/20; G01C 21/203; G01C 23/005; G01C 21/00
USPC ............................ 701/21, 400, 408, 466, 467
See application file for complete search history.

(56) References Cited

U.S. PATENT DOCUMENTS 5,524,081 A * 6/1996 Paul .............................. 701/300
5,552,989 A * 9/1996 Bertrand ....................... 701/516
5,610,821 A * 3/1997 Gazis ................. G01C 21/3492
340/990

(Continued)

FOREIGN PATENT DOCUMENTS

EP 2775259 A1 9/2014
JP 09243382 B2 9/1997

(Continued)

OTHER PUBLICATIONS

ISA European Patent Office, Partial European Search Report Issued in European Patent Application No. 14164308, Aug. 21, 2014, 8 pages.

(Continued)

*Primary Examiner* — Fadey Jabr
*Assistant Examiner* — Angelina Shudy
(74) *Attorney, Agent, or Firm* — Alleman Hall McCoy Russell & Tuttle LLP

(57) ABSTRACT

A route display device is provided. The device includes an acquirer installed in a movable body and configured to acquire a position and a direction of the movable body. The device also includes a route memory configured to store a route with a plurality of waypoints. The device also includes a display unit including a display screen having a linear route display section and configured to linearly display the route in a vertical axis of the linear route display section and positional relation of either one of the movable body and one or more targets with respect to the route in left-and-right directions of the route in a horizontal axis of the linear route display section. The device also includes a display controller configured to control a display position of either one of the movable body and the target with respect to the route.

17 Claims, 7 Drawing Sheets

(56) References Cited

U.S. PATENT DOCUMENTS

| | | | | |
|---|---|---|---|---|
| 5,758,297 | A * | 5/1998 | Gaultier | G01C 21/20 340/971 |
| 6,085,129 | A * | 7/2000 | Schardt | G01C 23/00 340/971 |
| 6,912,463 | B2 * | 6/2005 | Miwa | G01C 21/20 342/357.51 |
| 6,995,690 | B1 * | 2/2006 | Chen | G01C 23/00 340/961 |
| 7,076,505 | B2 * | 7/2006 | Campbell | G01C 21/367 340/990 |
| 7,268,703 | B1 * | 9/2007 | Kabel et al. | 340/984 |
| 7,787,999 | B1 * | 8/2010 | Barber | G01C 23/005 340/988 |
| 7,818,120 | B2 * | 10/2010 | Poreda | G08G 3/02 342/357.25 |
| 7,930,097 | B2 | 4/2011 | Hess | |
| 8,099,201 | B1 * | 1/2012 | Barber et al. | 701/4 |
| 8,154,438 | B1 * | 4/2012 | Larson et al. | 342/145 |
| 8,296,001 | B1 * | 10/2012 | Kabel et al. | 701/21 |
| 8,423,278 | B2 * | 4/2013 | Kondo | B63B 49/00 342/176 |
| 8,670,925 | B2 * | 3/2014 | Gluck | 701/409 |
| 8,751,152 | B2 * | 6/2014 | Geelen et al. | 701/410 |
| 8,781,649 | B2 * | 7/2014 | Kar | G08G 5/0021 701/3 |
| 8,880,339 | B1 * | 11/2014 | Cooper | G01C 23/00 340/945 |
| 8,924,142 | B2 * | 12/2014 | Fink | G01C 21/3676 340/988 |
| 9,086,278 | B2 * | 7/2015 | Carnevali | G01C 21/00 |
| 9,109,915 | B2 * | 8/2015 | Letz | G01C 21/343 |
| 9,405,445 | B2 * | 8/2016 | Carnevali | G01C 21/203 |
| 2002/0169527 | A1 * | 11/2002 | Cline | G08G 3/00 701/21 |
| 2003/0078706 | A1 * | 4/2003 | Larsen | 701/21 |
| 2004/0189492 | A1 | 9/2004 | Selk, II et al. | |
| 2005/0010359 | A1 * | 1/2005 | Qureshi | G01C 23/005 701/454 |
| 2005/0027434 | A1 * | 2/2005 | Hirose | G01C 21/3492 701/117 |
| 2005/0027437 | A1 * | 2/2005 | Takenaga | G08G 1/0969 701/117 |
| 2007/0155404 | A1 * | 7/2007 | Yamane et al. | 455/456.1 |
| 2008/0133131 | A1 * | 6/2008 | Poreda | G01C 21/203 701/418 |
| 2008/0167804 | A1 * | 7/2008 | Geelen et al. | 701/207 |
| 2008/0208453 | A1 | 8/2008 | Fujimoto | |
| 2008/0228386 | A1 * | 9/2008 | Geelen | G01C 21/367 701/533 |
| 2009/0024311 | A1 * | 1/2009 | Hess | 701/200 |
| 2009/0224966 | A1 * | 9/2009 | Boling et al. | 342/357.1 |
| 2011/0208417 | A1 * | 8/2011 | Fink et al. | 701/200 |
| 2011/0313655 | A1 * | 12/2011 | Litvack | G01C 21/20 701/426 |
| 2013/0181858 | A1 * | 7/2013 | Kojima et al. | 342/51 |
| 2013/0271492 | A1 * | 10/2013 | Shimizutani | G09G 5/006 345/634 |
| 2013/0275046 | A1 * | 10/2013 | Shimizutani | G01C 21/203 701/533 |
| 2013/0317740 | A1 * | 11/2013 | Dewas | G01C 21/00 701/466 |
| 2014/0039734 | A1 * | 2/2014 | Ramaiah et al. | 701/14 |
| 2014/0163861 | A1 * | 6/2014 | Beaurepaire | G06Q 10/00 701/400 |
| 2014/0180584 | A1 * | 6/2014 | Carnevali | G01C 21/00 701/533 |
| 2014/0253597 | A1 * | 9/2014 | Dohi | G01W 1/02 345/656 |
| 2014/0278071 | A1 * | 9/2014 | San Filippo et al. | 701/465 |
| 2015/0330803 | A1 * | 11/2015 | Okuda | G01C 21/3664 701/487 |
| 2015/0330804 | A1 * | 11/2015 | Okuda | G01C 21/3664 701/487 |
| 2016/0101838 | A1 * | 4/2016 | Kojima | B63B 49/00 701/21 |
| 2016/0121980 | A1 * | 5/2016 | Okuda | G01C 21/203 701/21 |
| 2016/0178383 | A1 * | 6/2016 | Mays | G01C 21/3682 701/408 |

FOREIGN PATENT DOCUMENTS

| | | |
|---|---|---|
| JP | 2000065589 B2 | 3/2000 |
| JP | 2004030457 A | 1/2004 |
| JP | 2004294340 A | 10/2004 |

OTHER PUBLICATIONS

European Patent Office, Office Action Issued in European Patent Application No. 14164308.0, Jul. 14, 2016, Netherlands, 7 pages.

* cited by examiner

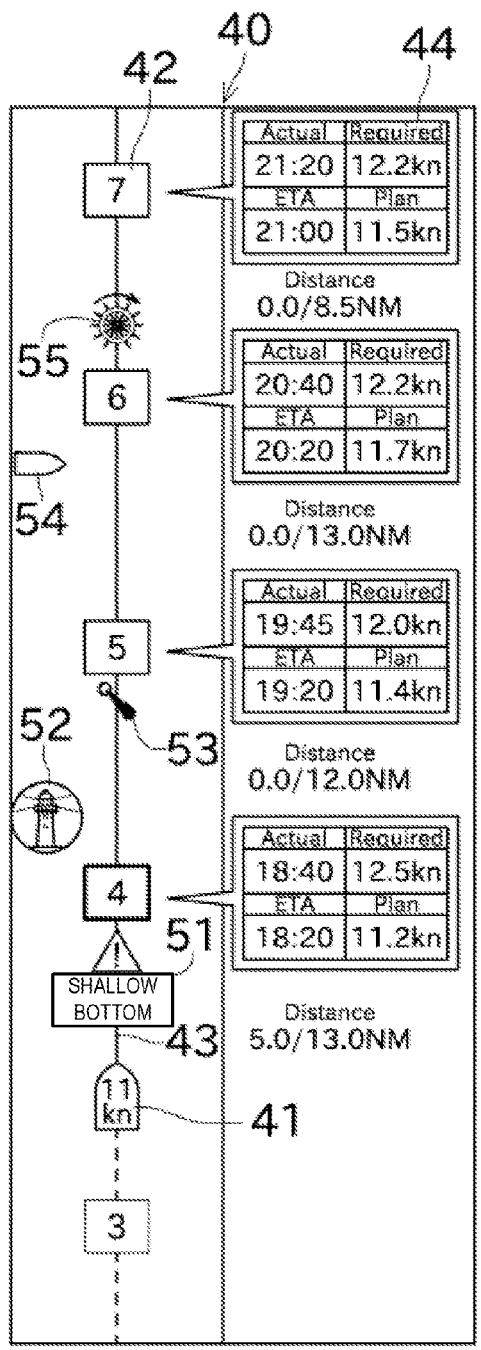
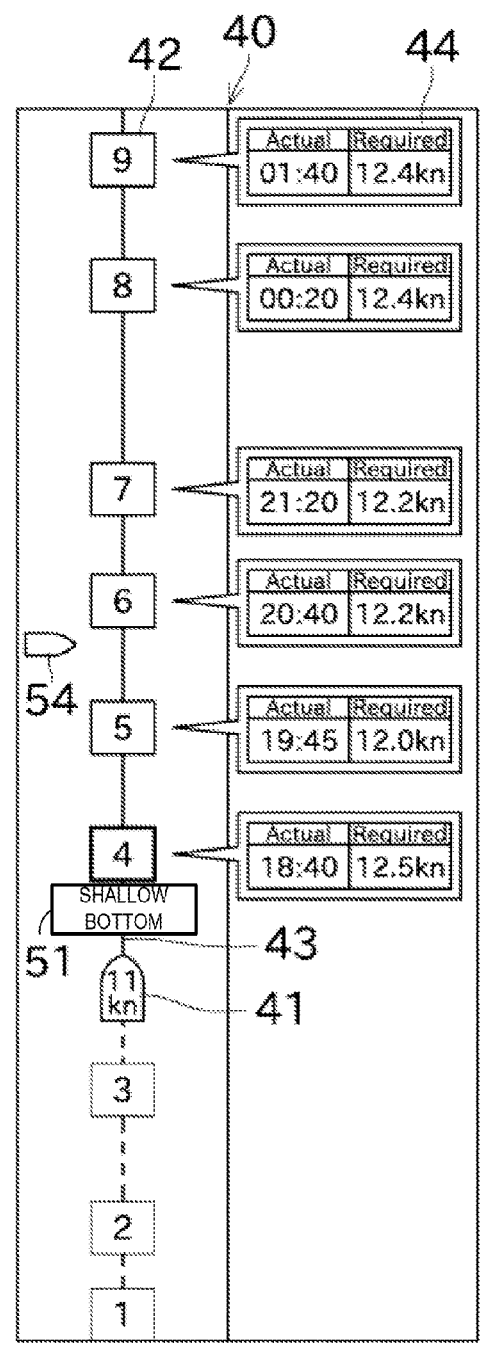
FIG. 3A — NEIGHBORHOOD DISPLAY (LARGE-SCALE)
FIG. 3B — OVERALL DISPLAY (SMALL-SCALE)

METHOD AND DEVICE FOR DISPLAYING ROUTE

CROSS-REFERENCE TO RELATED APPLICATION(S)

This application claims priority under 35 U.S.C. §119 to Japanese Patent Application No. 2013-083986, which was filed on Apr. 12, 2013, the entire disclosure of which is hereby incorporated by reference.

TECHNICAL FIELD

The present invention relates to a route display device which converts a set route into a linear route and displays it, and also displays traveling status on the route.

BACKGROUND OF THE INVENTION

Conventionally, route display devices (navigation devices) which display set routes and positions of moving bodies on the routes have been known. Generally, a route display device displays a route on a map or a nautical chart, and displays a mark indicating a moving body on the map or the like.

However, in a case where only this kind of display method is used, the following problems arise. Specifically, since a route is set curvy in many cases, it is difficult to grasp traveling status on the route at a glance. Moreover, when a long distance route is set, in order to grasp the traveling status on the route, it is required to zoom out the map or the nautical chart to display the entire route. On the other hand, in order to check the situation around the movable body, it is required to zoom in the map or the nautical chart. Thus, the zooming operation needs to be performed frequently, and this has been a stress to the operator.

JP3410028B and JP3381511B disclose arts which solve these problems. In JP3410028B and JP3381511B, a set route and another route which is the set route with its shape converted into a linear shape are displayed, and a position of a movable body on the route is displayed. Hereinafter, these arts are described in detail.

JP3410028B discloses a navigation device for automobiles. The navigation device can be set with predetermined passing points (waypoints) between a departing position and a destination. The navigation device can display a route including the waypoints and another route indicating the same route described above, with the waypoints arranged linearly. The navigation device also displays an estimated time of arrival at each waypoint, a period of time required to travel between adjacent waypoints, and the like. Moreover, when a traveling schedule is delayed, the navigation device notifies it to an operator by changing a display color of a mark indicating the position of the automobile.

JP3381511B, similarly to JP3410028B, discloses a navigation device for automobiles which can display a route and another route which is the same route with its shape converted into a linear shape. The navigation device displays details and a start time of a schedule on the linear route. Moreover, once the automobile goes off the route, the navigation device reroutes and displays a new route on a map.

Moreover, although it is not configured to perform a voyage of a movable body, JP2004-030457A discloses a handheld terminal which displays a stopover and the like linearly and also displays associated information. Specifically, in the handheld terminal of JP2004-030457A, a departing station, a transfer station, and a destination are arranged linearly, and a train situation, an arrival time, a fare, and the like are displayed therearound.

However, in JP3410028B, JP3381511B, and JP2004-030457A, only the traveling situation on the route, the estimated time of arrival, the schedule and the like are displayed on the linear-shaped route, and information that is required in traveling on the route is not displayed sufficiently.

Specifically, in JP3381511B, although the navigation device reroutes when the movable body goes off the route, there is no description regarding a method of displaying, on the linear route, the situation that the movable body is off the route and how to fix the situation. Especially, in the fields of ships and aircrafts, since there is no concept of moving along the street as automobiles do, it is hard to know that the ship or the aircraft is off the route. Therefore, when the ship or the aircraft goes off the route, notifying this situation is particularly needed. Moreover, in JP3410028B, JP3381511B, and JP2004-030457A, positional relation of other target(s) with the linear route is not displayed.

Due to such situations, the operator has been required to frequently check both the route displayed on the map and the linearly-converted route.

Moreover, in JP3410028B, JP3381511B, and JP2004-030457A, circumferential information of the route (e.g., a landmark and a shop) is not displayed on the linear route. Therefore, also in this regard, the operator has been required to frequently check both the surrounding of the route displayed on the map and the linearly-converted route, and there has been a room for improvement.

SUMMARY OF THE INVENTION

The present invention is made in view of the above situations, and mainly aims to provide a route display device which converts a route into a linear shape route and displays it, and also displays positional relation of a movable body and/or other target with the route.

According to a first aspect of the present invention, a route display device is provided. The route display device includes an acquirer, a route memory, a display unit, and a display controller. The acquirer is installed in a movable body and acquires a position and a direction of the movable body. The route memory stores a route with a plurality of waypoints. The display unit includes a display screen having a linear route display section and linearly displays the route in a vertical axis of the linear route display section and positional relation of either one of the movable body and one or more targets with respect to the route in left-and-right directions of the route in a horizontal axis of the linear route display section. The display controller controls a display position of either one of the movable body and the one or more targets with respect to the route.

Thus, by displaying the route linearly, an operator can instinctively grasp the traveling situation on the route. Moreover, the operator can instinctively grasp the positional relation of either one of the movable body and the one or more targets with respect to the route in the left-and-right directions of the route.

When the movable body is off the route, the display controller may display the movable body separated from the route, corresponding to the positional relation of the movable body with the route.

Thus, the operator can instinctively grasp that the movable body is off the route and the direction to which the movable body is off.

The display controller may display the movable body corresponding to the acquired direction of the movable body.

In the case of linearly displaying the route, when the movable body moves on the route, the movable body is always oriented in a fixed direction (e.g., upward of the display screen when the display screen is oriented vertically). Therefore, by displaying the movable body to indicate its direction as described above, the operator can promptly and instinctively grasp that the course of the movable body is off and the direction to which the course is off.

The display controller may display, in the linear route display section, among the one or more targets, the target that has a possibility of colliding with the movable body traveling along the route, in either one of the same and different display mode with respect to a display mode of other target.

Thus, the operator can grasp the target with the possibility of collision and an expected position of the collision in advance, and therefore, the operator can take a measure early.

The display controller may control the horizontal and vertical axes of the linear route display section to indicate distance. Moreover, a display range of the vertical axis may be wider than a display range of the horizontal axis.

Thus, the horizontal axis indicates an off amount from the route and the vertical axis indicates the traveling situation on the route. Therefore, by enlarging the display range of the vertical axis to be wider than that of the horizontal axis, the image matching the operator's purpose can be displayed.

The display controller may control the horizontal axis of the linear route display section to indicate distance and the vertical axis of the linear route display section to indicate time.

By having the vertical axis to indicate time as above, the operator can instinctively grasp the traveling situation on the route in terms of time.

The display controller may display, in the linear route display section, a movable body mark indicating a current position of the movable body and a reference mark that moves along the route according to a time schedule for the movable body to travel on the route.

Thus, a gap between a position at which the movable body is when traveling according to the schedule and the actual current position can be clearly displayed, the operator can instinctively grasp how much acceleration the movable body needs.

The movable body may be a ship.

Although it is difficult to grasp on the sea whether the movable body is traveling on the route since there is no street, by displaying the position and the like of the ship with respect to the route as described above, the operator can easily grasp that the movable body is traveling on the route.

The display controller may display, in the linear route display section, positional information of a beacon.

Thus, when the beacon is displayed near the ship in the linear route display section, by visually checking the actual beacon, the operator can confirm that the ship is on the route.

The display controller may display, in the linear route display section, positional information of a channel buoy.

Thus, the operator can instinctively grasp the position of the channel buoy existing near the route. Therefore, the operator can avoid the channel buoy early. Moreover, the operator can grasp a suitable course by grasping the position of the channel buoy.

The display controller may display, in the linear route display section, a course-changing point indicating a timing of starting to change, after the movable body passes a waypoint, a course of the movable body to the next waypoint.

Thus, the operator can instinctively grasp the position to turn the ship toward the next waypoint.

In addition to the course-changing point, information indicating the course changing direction may be displayed in the linear route display section.

Thus, the operator can instinctively grasp, not only the position to turn, but also the direction to turn.

The display controller may display a dangerous zone in the linear route display section.

Thus, the operator can instinctively grasp the position of the dangerous zone existing near the route. Therefore, the operator can avoid the dangerous zone early.

The dangerous zone may be a shallow bottom zone.

Thus, the operator can avoid the shallow bottom zone early.

According to a second aspect of the present invention, the following route display method is provided. That is, the route display method includes acquiring a position and a direction of a movable body, and linearly displaying the route in a vertical axis of a linear route display section of a display unit and positional relation of either one of the movable body and one or more targets with respect to the route in left-and-right directions of the route in a horizontal axis of the linear route display section of the display unit.

Thus, by displaying the route linearly, an operator can instinctively grasp the traveling situation on the route. Moreover, the operator can instinctively grasp the positional relation of either one of the movable body and the one or more targets with respect to the route in the left-and-right directions of the route.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 3A and 3B are views illustrating a situation when a scale of a linear route display section is changed;

DETAILED DESCRIPTION

Figure 1:
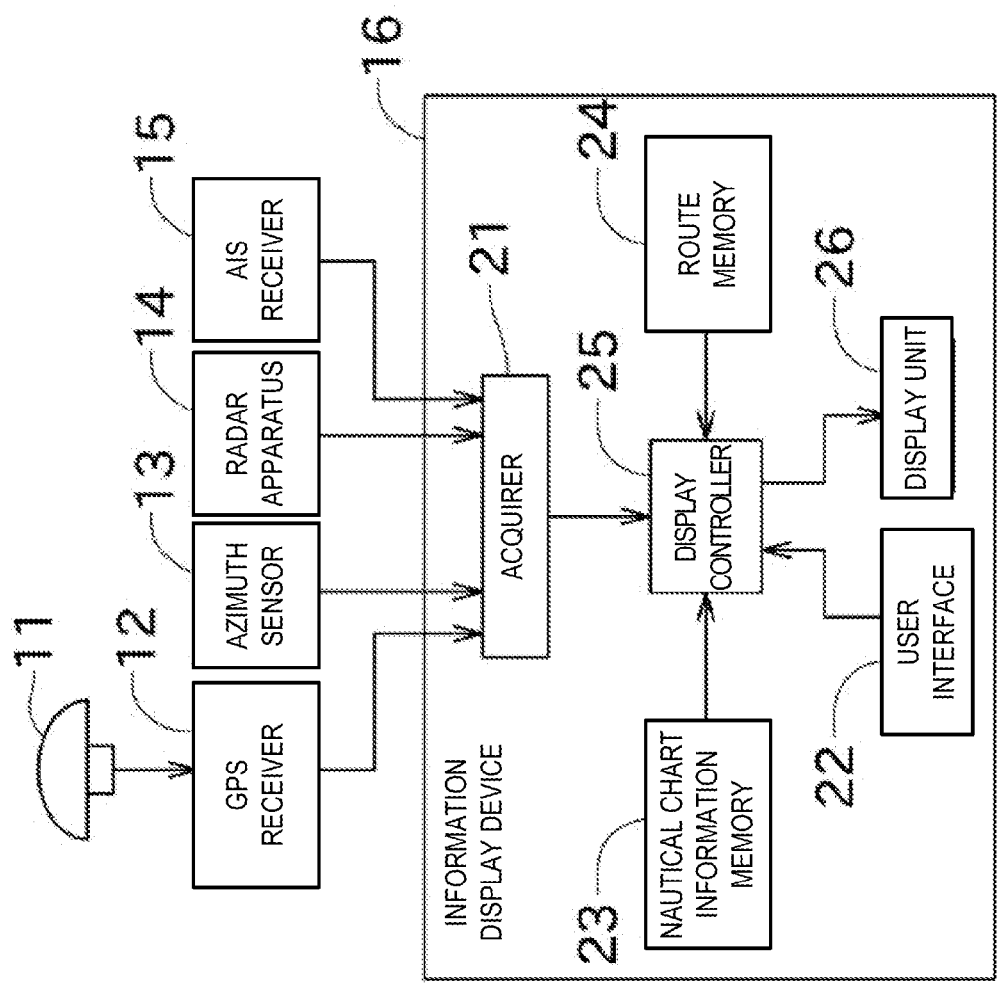
FIG. 1 is a block diagram of an information display device and associated equipment according to one embodiment of the present invention.

Next, one embodiment of the present invention is described with reference to the accompanying drawings. FIG. 1 is a block diagram of an information display device and associated equipment according to this embodiment.

An information display device 16 is installed in a ship (hereinafter, may be referred to as "the ship concerned" or simply as "the ship), and displays information acquired from various ship instruments. Specifically, the information display device 16 acquires information from a GPS receiver 12, an azimuth sensor 13, a radar apparatus 14, and an AIS receiver 15.

The GPS receiver 12 detects a position of the ship (a position of the GPS antenna 11) by performing a positioning based on positioning signals that are received by the GPS antenna 11. The positional information detected by the GPS receiver 12 is outputted to the information display device 16.

The azimuth sensor 13 includes a plurality of GPS antennas fixed to the ship, and detects a heading of the ship based on positional relation of the GPS antennas with each other. The heading of the ship detected by the azimuth sensor 13 is outputted to the information display device 16. Note that, the azimuth sensor 13 may be, for example, other than the configuration described above, a magnetic azimuth sensor or a gyrocompass.

The radar apparatus 14 transmits a radio wave and receives a reflection wave from a target. The term "target" as used herein refers to any objects or lives that are detectable by the radar apparatus 14. The reflection wave is suitably signal-processed (e.g., amplified) by the radar apparatus 14, and then is outputted to the information display device 16. Then, the information display device 16 obtains a distance of the target based on a period of time from the transmission of the radio wave to the reception of the reflection wave. Moreover, the information display device 16 obtains a direction in which the target exists, based on the direction to which the radio wave is transmitted. Thus, the information display device 16 creates a radar image. Note that, the signal processing performed by the radar apparatus 14 in this embodiment may be performed on the information display device 16 side, and the radar image created by the information display device 16 in this embodiment may be created on the radar apparatus 14 side.

Moreover, either one of the radar apparatus 14 and the information display device 16 achieves a TT function (Target Tracking function). Although the detailed description of the TT function is omitted since it is known, the TT function is for estimating a speed vector of the target by detecting/acquiring a position of the target based on the reflection wave, and tracking a movement of the target based on a time transition of the position. Thus, the information display device 16 can estimate a position of a moving target (normally another ship) and a course for the moving target to travel thereafter.

The AIS receiver 15 receives AIS information outputted from an AIS (Automatic Identification System) installed in the other ship. The AIS information of the other ship received by the AIS receiver 15 is outputted to the information display device 16. This AIS signal includes the information of, for example, a position, a speed, and a course of the other ship. Thus, the information display device 16 can estimate the position of the other ship and the course for the other ship to travel thereafter.

Next, the information display device 16 is described. As illustrated in FIG. 1, the information display device 16 includes an acquirer 21, a user interface 22, a nautical chart information memory 23, a route memory 24, a display controller 25, and a display unit 26.

The acquirer 21 acquires various information from the GSP receiver 12, the azimuth sensor 13, the radar apparatus 14, and the AIS receiver 15. The acquirer 21 outputs the acquired information to the display controller 25.

The user interface 22 is, for example, one or more keys (e.g., arrow keys or a rotary key) operated by an operator.

The operator controls the user interface 22 to input instruction, and thus, the operator can create a route and change display setting. Note that, the user interface 22 is not limited to such one or more physical keys, and may be a touch panel. Moreover, it may be a mouse or a track ball which moves a pointer on a display screen.

The nautical chart information memory 23 stores an electric nautical chart. The electric nautical chart includes a position of land and also information required for voyage. Specifically, the information includes information of a beacon, a port, a channel buoy (buoy), a water depth, a bottom sediment, a coastal form, a dangerous zone (e.g., a shallow bottom, a freezing zone, and a voyage prohibited zone). The electric nautical chart stored in the nautical chart information memory 23 is outputted to the display controller 25 in response to a request from the display controller 25.

Note that, hereinafter, the contents displayed on the display unit 26 in a case where the display screen is oriented vertically are described. However, without limiting to this, even when the display screen is oriented in other direction, for example, horizontal, the configuration disclosed herein can similarly be applied.

The route memory 24 stores the created route. The route is created, for example, based on the instruction from the operator. Specifically, the operator selects a route creating mode by performing a predetermined operation on the user interface 22. Then, the operator specifies arbitrary positions (waypoints) on the nautical chart and finally specifies a destination to define the route. Thus, the route is created. The route memory 24 stores the route created by the operator and outputs it to the display controller 25 in response to the request from the display controller 25.

Figure 2:
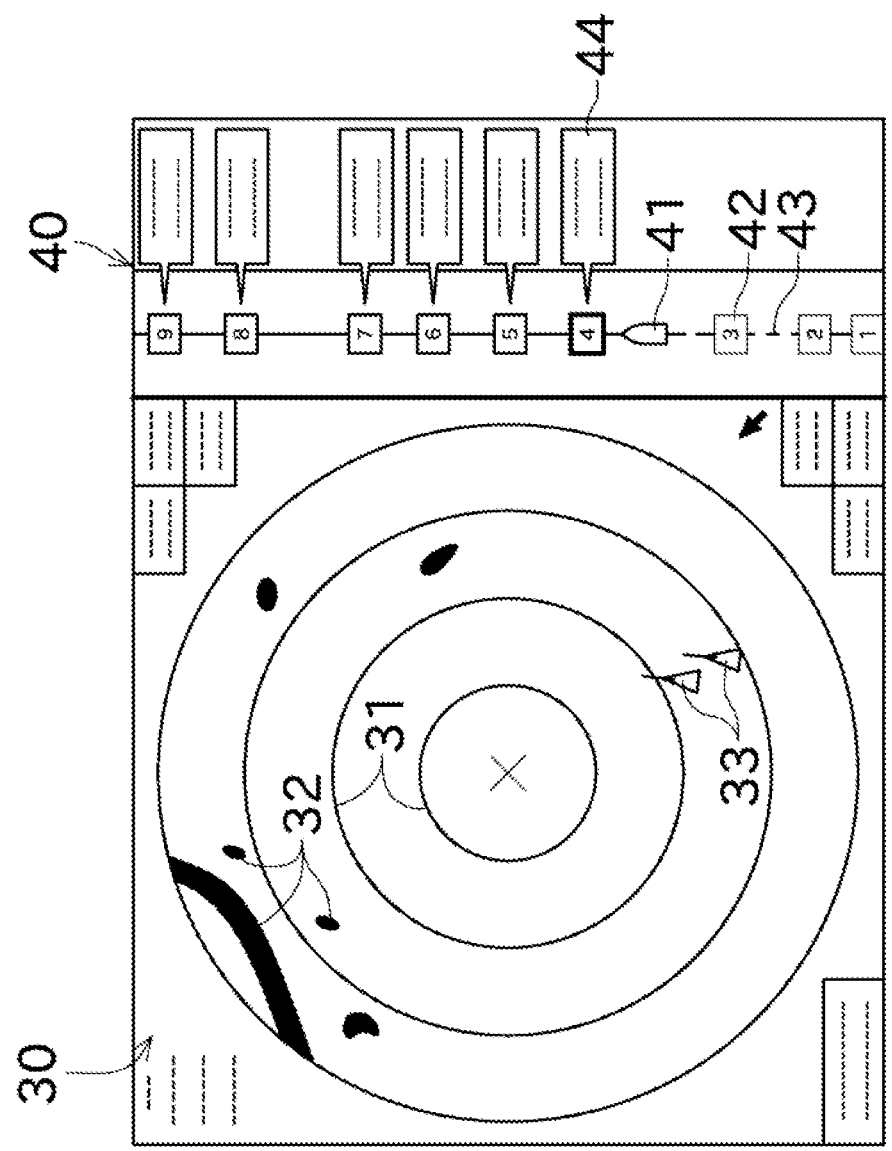
FIG. 2 is a view illustrating an image displayed on a display unit.

The display controller 25 depicts an image based on the information received externally or internally, and displays it on the display unit 26 comprised of, for example, a liquid-crystal display. Specifically, the display controller 25 creates the image illustrated in FIG. 2. FIG. 2 is a view illustrating then image displayed on the display unit. This image includes a radar image display section 30 displayed in a left part of the display screen, and a linear route display section 40 displayed in a right part of the display screen.

A radar image is displayed in the radar image display section 30. The radar image is an image in which echo(es) are displayed centering on the ship. Specifically, in the radar image display section 30, range rings 31, echoes 32, and AIS symbols 33 are displayed.

Each range ring 31 indicates positions that are at the same distance from the ship position which is at the center of the image. Each echo 32 indicates the other ship or a land obtained based on the reflection wave caused by the radio wave transmitted from the radar antenna. Each AIS symbol 33 indicates the other ship obtained based on the AIS signal as described above.

In the linear route display section 40, the route is linearly displayed, in which the plurality of waypoints are linearly arranged such that the destination is on the upper side (the departing position is on the lower side). Hereinafter, the contents displayed in the linear route display section 40 are described. First, the main contents in the linear route display section 40 are described with reference to FIG. 3A.

FIGS. 3A and 3B are views illustrating a situation when a scale of a linear route display area is changed. As illustrated in FIG. 3A, in the linear route display section 40, a ship mark 41 (movable body mark), waypoint marks 42, a linear route 43, and arrival information display parts 44 are displayed. Note that, in the description below, regarding the displayed contents, the phrase "a display mode is controlled to be different" means "a color, a transparency, a shape, a size, blinking/not blinking, displaying/not displaying and/or the like are controlled to be different."

The ship mark 41 indicates the ship position. The ship speed is displayed inside the ship mark 41. Note that, the ship speed may be displayed at a different position.

Each waypoint mark 42 indicates the position of the waypoint. Note that, an interval between adjacent waypoint marks 42 in the linear route display section 40 is in proportion to an interval between the actual waypoints (waypoints on the nautical chart).

Moreover, the display mode of the waypoint mark 42 is different among the waypoint(s) which the ship has already passed, the next waypoint, and the waypoint(s) thereafter. In FIG. 3A, a frame line of the next waypoint mark 42 is thickened to be emphasized the most, then the frame lines are gradually thinned in the order of the waypoint mark(s) 42 after the next waypoint mark 42, and the waypoint mark(s) 42 which the ship has already passed, so as to lower the emphasizing level.

The linear route 43 is a linear line connecting the waypoint marks to each other. In this embodiment, the display mode of the linear route 43 is different between the section lower than the ship mark (departing position side) and the section upper than the ship mark (destination side). In FIG. 3A, similarly to the waypoint marks 42, a part of the linear route 43 which is upper than the ship mark is displayed emphasized than a part of the linear route 43 which is lower than the ship mark.

The arrival information display part 44 is displayed for each waypoint which the ship has not passed yet, to display information relating to an arrival time at the waypoint. Specifically, in "Actual" of FIGS. 3A and 3B, an expected time of arrival when the voyage is continued at the current ship speed is displayed. In "ETA" of FIGS. 3A and 3B which is an abbreviation of "Estimated Time of Arrival," an estimated time of arrival that is set during the route setting is displayed. In "Required" of FIGS. 3A and 3B, a ship speed required to arrive by the ETA is displayed. In "Plan" of FIGS. 3A and 3B, a ship speed which is set in the route setting is displayed. Each value in the arrival information display part 44 is updated as needed according to the progression of the voyage.

Moreover, a configuration may be adopted, in which when it is determined that the ship will not arrive by the ETA, the display modes of the ship mark 41 and/or the other contents are changed to notify the operator.

Moreover, a distance between adjacent waypoints and a distance which the ship has actually traveled are displayed between the corresponding arrival information display parts 44.

Here, by controlling the user interface 22, a display range of the linear route display section 40 can be enlarged as illustrated in FIG. 3B. Moreover, when the display range is enlarged, only "Actual" and "Required" are displayed in the arrival information display part 44. Note that, a priority is set in the information displayed in the linear route display section 40 according to the instruction from the operator, importance of the information and the like, and when the display range is enlarged, the interval between the waypoint marks becomes narrower, and therefore, the information with low priority is not displayed.

Figure 4:
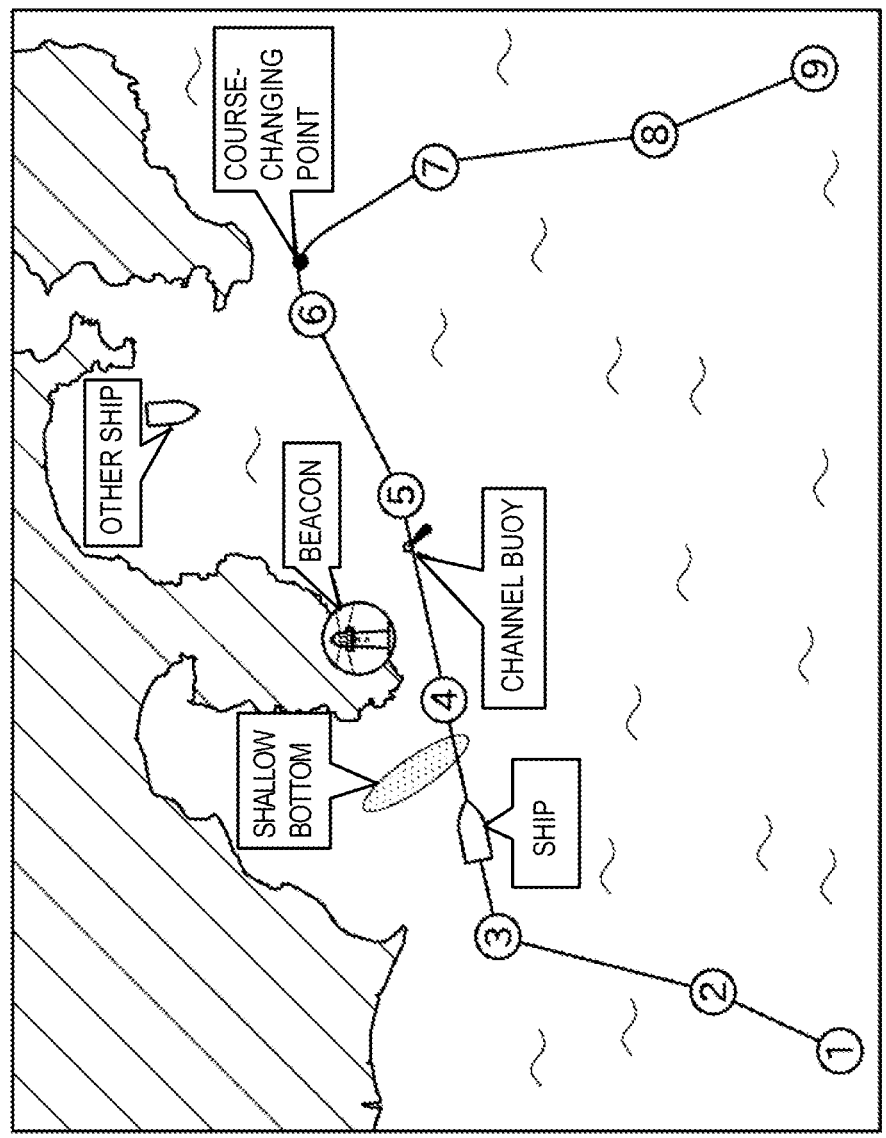
FIG. 4 is a view schematically illustrating a route and targets near the route.
Figure 5A:
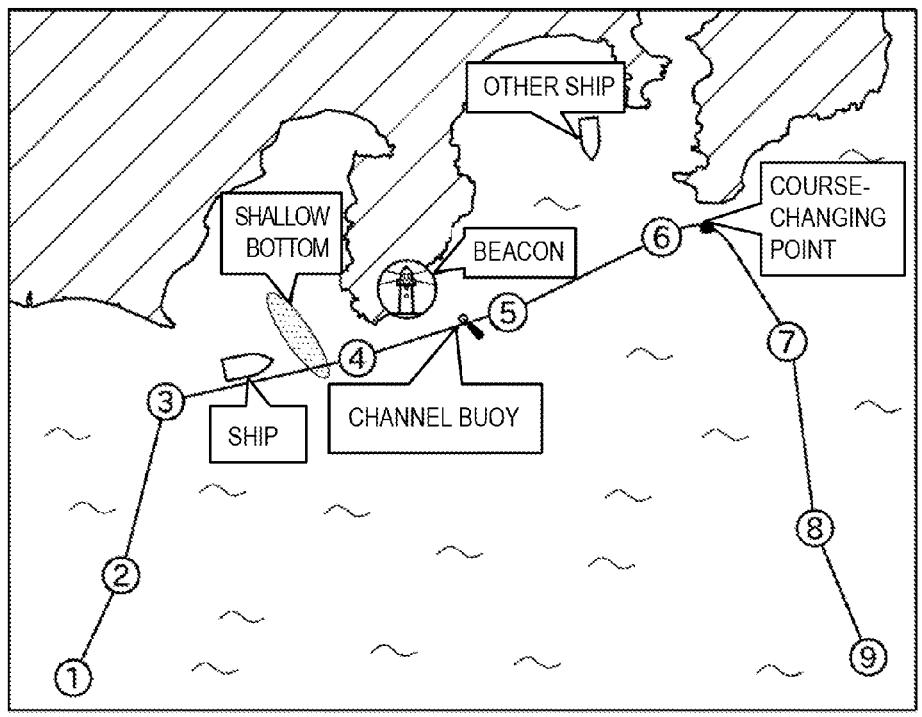
FIGS. 5A and 5B are views illustrating a situation where a position of a ship is off the route and a situation where a direction of the ship is off the route, respectively.
Figure 5B:
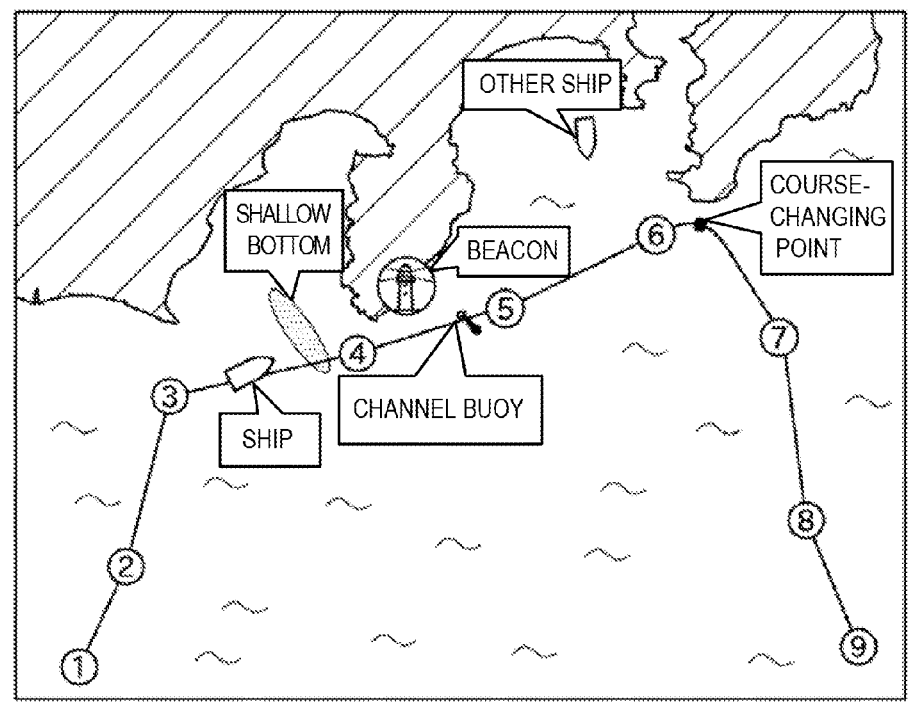
Figure 6A:
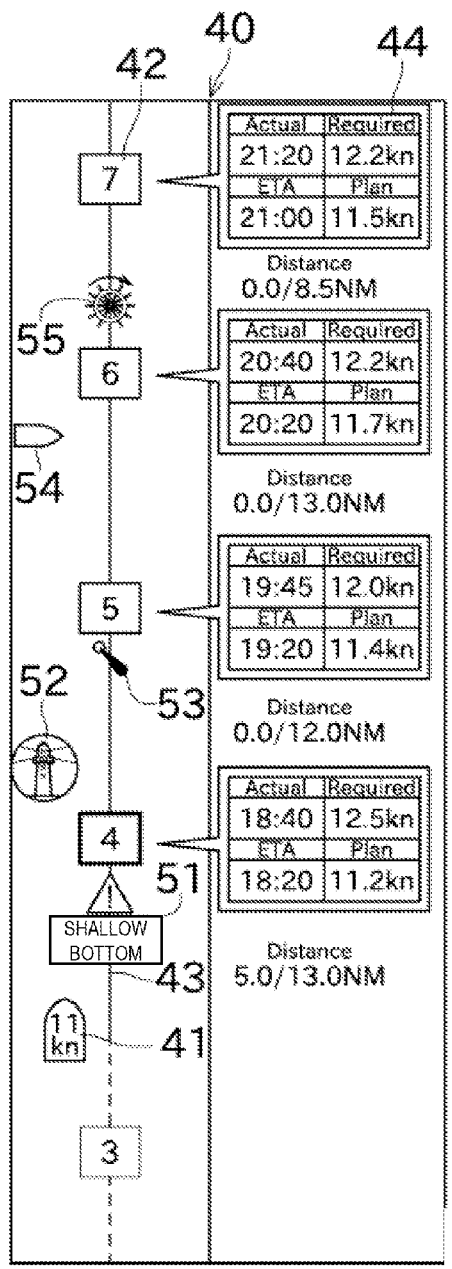
FIGS. 6A and 6B are views illustrating the linear route display section when the position of the ship is off the route and when the direction of the ship is off the route, respectively.
Figure 6B:
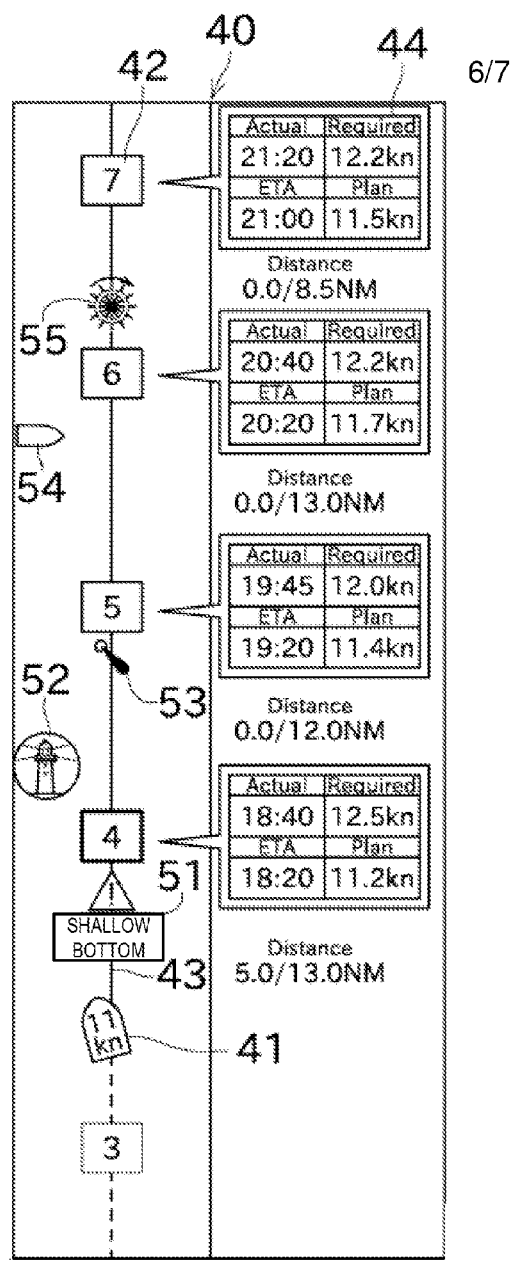

Next, processing performed by the display controller 25 to control a display position of either one of the ship and other targets based on positional relation between the route and either one of the ship and the other targets is described. FIG. 4 is a view schematically illustrating a route and targets near the route. FIGS. 5A and 5B are views illustrating a situation where a position of a ship is off the route and a situation where a direction of the ship is off the route, respectively. FIGS. 6A and 6B are views illustrating the linear route display section when the position of the ship is off the route and when the direction of the ship is off the route, respectively. Moreover, "the direction of the ship (movable body)" indicates either one of the heading (the direction of the nose) and the traveling direction of the ship.

Moreover, in this embodiment, the vertical axis and horizontal axis of the linear route display section 40 indicate distance. Note that, based on JP3410028B, JP3381511B, and JP2004-030457A, the concept of the horizontal axis does not exist in the linear route display section. In this embodiment, since the horizontal axis indicates distance, the positional relation of either one of the movable body and the other targets with the route in left-and-right directions of the route can be displayed. Moreover, the display range of the vertical axis is wider than that of the horizontal axis. Specifically, the distance range in the vertical axis is in the unit from a few kilometers to a few dozen kilometers while the distance range in the horizontal axis is in the unit of a few meters.

First, processing performed by the display controller 25 to control the display position of the ship based on the positional relation between the route and the ship is described. When the position and the direction of the ship are along the route as illustrated in FIG. 4, the display controller 25 displays the ship mark 41 to be located on the linear route 43, and oriented upward (toward the destination) as illustrated in the linear route display section 40 of FIG. 3A.

Whereas, when the position of the ship is off the route as illustrated in FIG. 5A, the display controller 25 moves the ship mark 41 to be off the linear route 43 (to move horizontally) as illustrated in the linear route display section 40 of FIG. 6A.

Here, the horizontal moving direction of the ship mark 41 (moving leftward or rightward) corresponds to the positional relation between the ship and the route. Therefore, when the ship is off to the left of the route while orienting the travel direction as illustrated in FIG. 5A, the ship mark 41 is displayed to be also off to the left of the route while orienting the travel direction as illustrated in FIG. 6A.

Moreover, regarding the ship mark 41, not only the moving direction, but the move amount also corresponds to the positional relation between the ship and the route. For example, the move amount of the ship mark 41 can be changed continuously according to the distance between the route and the ship. In this case, the positional relation between the ship and the route can be grasped in detail. However, also when the ship repeats winding and then fixing its position due to the influence of waves or the like, the ship mark 41 moves twitchily.

To solve this situation, the position of the ship mark 41 may be changed in a stepwise fashion according to the distance between the route and the ship. In this case, the ship mark 41 does not go off the linear route 43 until the distance between the route and the ship exceeds a predetermined value, and therefore, the ship mark 41 can be prevented from moving twitchily.

Whereas, when the direction of the ship is off the route as illustrated in FIG. 5B, the display controller 25 tilts and displays the ship mark 41.

Specifically, the display controller 25 controls the ship mark 41 to tilt corresponding to the direction of the ship. Moreover, the tilt angle of the ship mark 41 may be changed continuously according to the direction of the ship, or may be changed in the stepwise fashion according to the direction of the ship to prevent the ship mark from moving twitchily. Note that, the tilt angle of the ship mark 41 may correspond to the direction of the ship with respect to a part of the route toward the next waypoint.

Next, processing performed by the display controller 25 to control the display positions of the other targets based on the positional relation of the route with the other targets is described. Moreover, in this embodiment, the other targets are displayed using various marks. In FIG. 4, the other targets (a shallow bottom, a beacon, a channel buoy, and the other ship) and a course-changing point. In FIG. 3A, an example in which the other targets and the course-changing point are displayed in the linear route display section 40 by using marks is illustrated.

As illustrated in FIG. 4, a shallow bottom (shallow depth region) exists between waypoints 3 and 4. Therefore, in the linear route display section 40, as illustrated in FIG. 3A, a shallow bottom mark 51 indicating the shallow bottom is displayed between the waypoints 3 and 4.

Moreover, whether the ship collides with the shallow bottom when passing thereover depends on the water depth to the shallow bottom and a draft of the ship. The water depth to the shallow bottom can be acquired based on the nautical chart information. The draft of the ship can be obtained, for example, according to the shape of the ship and the ship speed. Thus, the display mode of the shallow bottom mark 51 to be displayed in the linear route display section 40 may be controlled to be different based on the possibility that the ship collides with the shallow bottom.

As illustrated in FIG. 4, between waypoints 4 and 5, a beacon exists on the left of the route with respect to the traveling direction. Therefore, in the linear route display section 40, as illustrated in FIG. 3A, between the waypoints 4 and 5, a beacon mark 52 indicating the beacon is displayed on the left of the route with respect to the traveling direction.

Moreover, as illustrated in FIG. 4, a channel buoy exists between the waypoints 4 and 5. Therefore, in the linear route display section 40, as illustrated in FIG. 3A, a channel buoy mark 53 indicating the channel buoy is displayed between the waypoints 4 and 5. Note that, the channel buoy mark 53 may be changed in shape or textual information may be displayed thereon according to the kind of the channel buoy.

Note that, the information display device 16 acquires the positions of the beacon and the channel buoy, for example, based on the nautical chart information stored in the nautical chart information memory 23.

As illustrated in FIG. 4, the other ship moves toward between the waypoints 5 and 6. Moreover, the other ship is located on the left of the route with respect to the traveling direction. An estimated time of arrival of the other ship at the route can be calculated based on a current speed of the other ship and a distance from the other ship to the route. When the estimated time of arrival of the other ship is close to the estimated time of arrival of the ship at the same location, the display controller 25 displays an other-ship mark 54 in the linear route display section 40.

By displaying only the other ship that has the possibility of collision in the linear route display section 40 instead of displaying all the other ships, degradation of visibility in the linear route display section 40 can be prevented. Note that, the position, the direction, and the speed of the other ship are acquired based on the AIS information and the TT information. Moreover, since the course of the other ship is no more than a prediction, the display mode of the other-ship mark 54 may be controlled to be different based on the prediction accuracy (possibility of collision).

As illustrated in FIG. 4, the part of the route from the waypoint 6 to a waypoint 7 is set slightly curvy instead of linearly. In this case, the point where the course of the ship is started to change is referred to as the course-changing point. A course-changing point mark 55 indicating the course-changing point is displayed in FIG. 3A. The course-changing point mark is comprised of a graphic indicating that it is the course-changing point, and an arrow indicating the course changing direction (either left or right). Note that, the course changing direction is not limited to be displayed with an arrow, but also with letter(s).

By displaying the various information in the linear route display section 40, the operator can instinctively grasp, for example, traveling status on the route, a required speed, matters to be aware of in the voyage. Especially on the sea, ships and the like do not frequently change their directions as automobiles on streets, voyage can be performed suitably by only looking at the linear route display section 40.

Figure 7A:
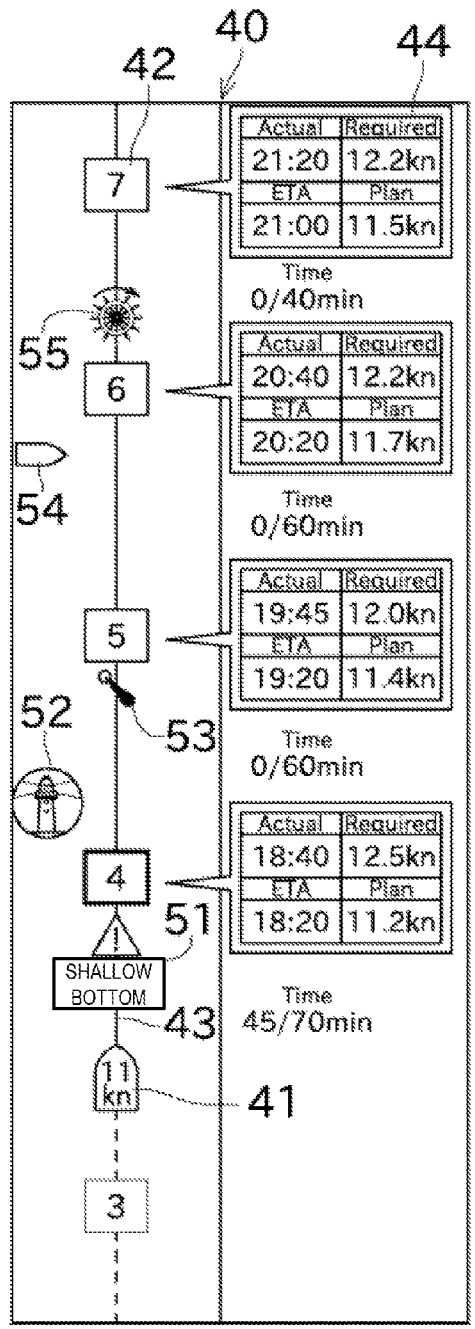
FIGS. 7A and 7B are views illustrating the linear route display section according to modifications.
Figure 7B:
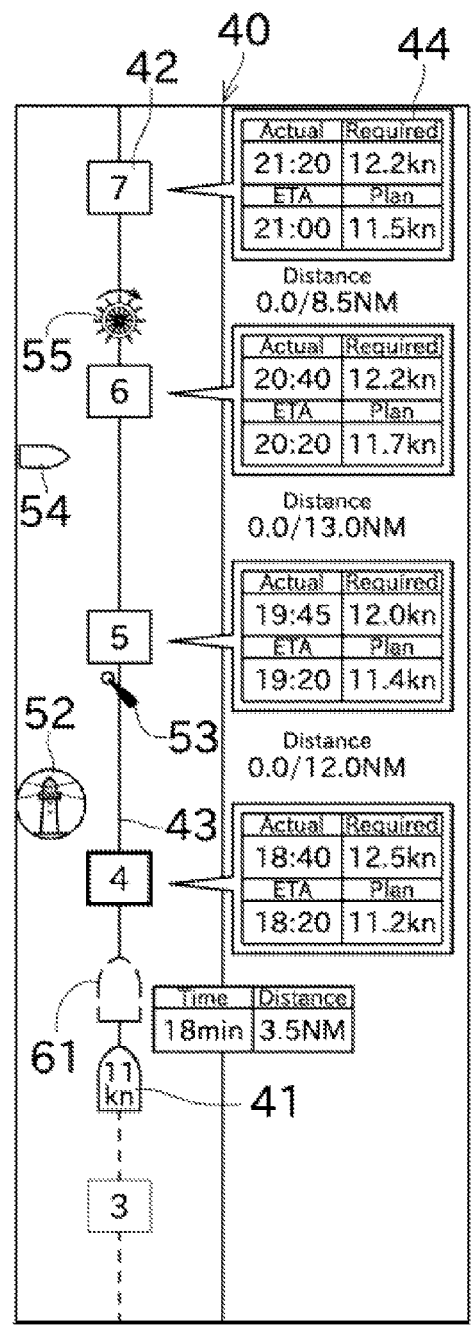

Next, modifications of the above embodiment are described. FIGS. 7A and 7B are views illustrating the linear route display section 40 according to the modifications.

In the above embodiment, the vertical axis of the linear route display section 40 indicates distance; however, in the modification of FIG. 7A, the vertical axis of the linear route display section 40 indicates time. Therefore, between the arrival information display parts 44 of adjacent waypoints, instead of the distance therebetween, a required period of time to travel between the waypoints and a period of time actually spent to travel between the waypoints are displayed.

By this displaying method, the operator can instinctively grasp the traveling status on the route in terms of time. Particularly, when the ship speed changes rapidly, if the vertical axis indicates distance, it is generally difficult to grasp the traveling status on the route in terms of time; however, with the displaying method of this modification, the traveling status can be grasped instinctively.

In the modification of FIG. 7B, a reference mark 61 is displayed in addition to the ship mark 41. The reference mark 61 moves according to the time schedule for the movable body to travel on the route. By displaying the reference mark 61, the operator can instinctively grasp how much the ship is behind the schedule.

Moreover, a distance and a time difference between the ship mark 41 and the reference mark 61 are displayed near either one of the reference mark 61 and the ship mark 41. The time difference is obtained based on a difference in speed between the ship mark 41 and the reference mark 61 and the distance between the ship mark 41 and the reference mark 61. Thus, the operator can grasp how much the ship is behind the schedule in detail.

As described above, the information display device 16 of the above embodiment includes the acquirer 21, the route memory 24, the display unit 26, and the display controller 25. The acquirer 21 is installed in the ship and acquires the position and the direction of the ship. The route memory 24 stores the route with the plurality of waypoints. The display unit 26 has the display screen formed with the linear route display section 40 and displays the route linearly in the vertical axis of the linear route display section 40 and the positional relation of either one of the ship and the other targets with the route in the left-and-right directions of the route in the horizontal axis of the linear route display section 40. The display controller 25 displays the ship position with respect to the route in the linear route display section 40 by using the ship mark 41 indicating the ship.

Thus, by displaying the route linearly, the operator can instinctively grasp the traveling status on the route. Moreover, the operator can instinctively grasp the positional relation of either one of the ship and the other targets with the route in the left-and-right directions.

Although the preferred embodiment of the present invention and the modifications thereof are described above, the above configuration may be modified as follows.

In the description above, the display controller 25 controls the display positions of both of the ship (movable body) and the other targets with respect to the linear route in the left-and-right directions; however, it may be such that only one of the display positions is controlled.

For example, when only the display position of the ship is controlled, the positional control of the other marks (e.g., the shallow bottom mark 51) displayed in the linear route display section 40 is not required, and therefore, the processing amount of the display controller 25 can be reduced. Moreover, visibility can be improved by not displaying the other marks.

Whereas, the control may be performed such that only the display positions of the other targets are controlled. For example, in the case of performing the voyage by an autopilot device, the ship hardly goes off the route and the operator does not steer the ship in many cases, and therefore, the need to control the display position of the ship with respect to the route is low. Therefore, by adopting this configuration, the processing amount of the display controller 25 can be reduced and the linear route display section 40 can be simplified.

In the description above, in the linear route display section 40, the interval between the adjacent waypoint marks 42 is matched with the interval between the actual waypoints; however, the interval between the waypoint marks 42 may be fixed.

In the description above, the linear route display section 40 is displayed next to the radar image display section 30; however, it may be displayed next to an image other than the radar image (e.g., an image showing the ship on the nautical chart or an underwater detecting image). Moreover, the linear route display section 40 may be displayed alone.

In the description above, the linear route display section 40 is displayed in the right end of the display screen; however, it may be displayed in the left end of the display screen. Moreover, the linear route display section 40 may be displayed in the center of the display screen and other images may be displayed on the left and right thereof.

In the description above, among the information stored in the nautical chart information memory 23, the positions of the shallow bottom, the beacon, and the channel buoy are displayed in the linear route display section 40; however, other information stored in the nautical chart information memory 23 may also be displayed in the linear route display section 40.

In the description above, the ship position is detected based on the signals from the GPS satellites; however, the ship position may be detected by utilizing other kinds of GNSS (Global Navigation Satellite System) satellites. Specific examples of the other kinds of GNSS satellites include GLONASS satellites and GALILEO satellites.

In the description above, the ship is used as an example of the movable body; however, the present invention may be applied to other kinds of movable bodies (e.g., aircrafts). Particularly, since aircrafts do not frequently change their directions as automobiles on streets, the present invention can suitably be applied to them in a view that they can travel suitably by only the operator looking at the linear route display section. In the case with aircrafts, the aircraft concerned, other aircraft(s), meteorological information, course-changing point(s), and radio beacon(s) are displayed in the linear route display section.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A maritime route display device configured for use on a ship, comprising:
 a display device;
 a Global Positioning System (GPS) sensor;
 a non-volatile memory device; and
 a processor configured to:
  acquire a position and a direction of the ship at least from the GPS sensor;
  store positional information of a beacon or a channel buoy on the non-volatile memory device;
  store a route defined by a plurality of operator-specified waypoints on the non-volatile memory device;
  display a straight line representation of the entire route that includes the plurality of operator-specified waypoints located at intervals along the straight line in proportion to actual relative distances between the waypoints in a vertical axis of the display device;
  determine positional relations of the ship and the one or more targets with respect to the route in left-and-right directions of the route, the one or more targets including the beacon or the channel buoy;
  display the ship and one or more targets in a horizontal axis of the display device with respect to the straight line representation of the entire route according to the determined positional relations of the ship and one or more targets with respect to the route; and
  control a display position of the ship and the one or more targets with respect to the straight line representation of the entire route.

2. The maritime route display device of claim 1, wherein when the ship is off the route, the processor is configured to display the ship separated from the straight line representation of the entire route, corresponding to the positional relation of the ship with the route.

3. The maritime route display device of claim 1, wherein the processor is configured to display the ship at a tilt angle with respect to the straight line representation of the entire route, corresponding to the acquired direction of the ship with respect to a part of the route toward a next waypoint of the plurality of operator-specified waypoints.

4. The maritime route display device of claim 1, wherein the route display device further comprises an automatic identification system (AIS) including an AIS receiver configured to receive AIS information from a plurality of other ships separate from the ship, the AIS information including course information for the plurality of other ships, and wherein the processor is configured to display a positional relation of another ship relative to the ship on the display device, the other ship being one of the plurality of other ships that has a possibility of colliding with the ship traveling along the route based on acquired course information for the other ship.

5. The maritime route display device of claim 1, wherein the processor is configured to control the horizontal and vertical axes of the display device to indicate distance, and
wherein a display range of the vertical axis is wider than a display range of the horizontal axis.

6. The maritime route display device of claim 1, wherein the processor is configured to control the horizontal axis of the display device to indicate distance and the vertical axis of the display device to indicate time.

7. The maritime route display device of claim 1, wherein the route includes a time schedule for the ship to travel on the route, and the processor is configured to display, on the display device, a ship mark indicating a current position of the ship and a reference ship mark that moves along the straight line representation of the entire route according to the time schedule and indicates a scheduled position of the ship were the ship moving according to the time schedule.

8. The maritime route display device of claim 1, wherein the processor is configured to display, on the display device, a course-changing point indicating a timing of starting to change, after the ship passes a waypoint, a course of the ship to a next waypoint.

9. The maritime route display device of claim 8, wherein, in addition to the course-changing point, the processor is configured to display information indicating the course changing direction on the display device.

10. The maritime route display device of claim 1, wherein the processor is configured to display a dangerous zone on the display device.

11. The maritime route display device of claim 10, wherein the dangerous zone is a shallow bottom zone.

12. A maritime route display method, comprising:
acquiring a position and a direction of a ship at least from a Global Positioning System (GPS) sensor; and
storing a route defined by a plurality of operator-specified waypoints;
displaying a straight line representation of the entire route that includes the plurality of operator-specified waypoints located at intervals along the straight line in proportion to actual relative distances between waypoints in a vertical axis of a display device;
determining positional relations of the ship and one or more targets with respect to the route in left-and-right directions of the route, the one or more targets including a beacon or a channel buoy; and
displaying the ship and one or more targets in a horizontal axis of the display device with respect to the straight line representation of the entire route according to the determined positional relations of the ship and one or more target with respect to the route.

13. The maritime route display device of claim 12, wherein when the ship is off the route, a ship mark is displayed to be separated from the straight line representation of the entire route, corresponding to the positional relation of the ship with the route.

14. The maritime route display device of claim 12, wherein a ship mark is displayed at a tilt angle with respect to the straight line representation of the entire route, corresponding to the acquired direction of the ship with respect to a part of the route toward a next waypoint of the plurality of operator-specified waypoints.

15. The maritime route display device of claim 12, wherein the horizontal and vertical axes of the display device indicates distance, and
wherein a display range of the vertical axis is wider than a display range of the horizontal axis.

16. The maritime route display device of claim 12, wherein the horizontal axis of the display device indicates distance and the vertical axis of the display device indicates time.

17. The maritime route display device of claim 12, wherein a ship mark indicates a current position of the ship and a reference ship mark that moves along the straight line representation of the entire route according to a time schedule for the ship to move along the route and indicates a scheduled position of the ship were the ship moving according to the time schedule.

* * * * *